United States Patent [19]

Ernst

[11] Patent Number: 4,522,350
[45] Date of Patent: Jun. 11, 1985

[54] SAFETY BELT EMERGENCY LOCKING RETRACTOR

[75] Inventor: Hans-Hellmut Ernst, Sulfeld, Fed. Rep. of Germany

[73] Assignee: Britax-Kolb GmbH & Co., Fed. Rep. of Germany

[21] Appl. No.: 551,946

[22] Filed: Nov. 15, 1983

[30] Foreign Application Priority Data

Nov. 20, 1982 [GB] United Kingdom ............... 8233186
Jan. 5, 1983 [GB] United Kingdom ............... 8300178

[51] Int. Cl.³ .............................................. B65H 75/48
[52] U.S. Cl. .......................... 242/107.4 A; 242/107.4 C
[58] Field of Search ............... 242/107.4 A, 107.4 C, 242/107.4 D, 107.4 B; 280/806; 297/478

[56] References Cited

U.S. PATENT DOCUMENTS

| 3,237,879 | 3/1966 | Whittingham | 242/107.4 C |
| 3,695,545 | 10/1972 | Peters | 242/107.4 A |
| 4,101,094 | 7/1978 | Wallin | 242/107.4 C X |
| 4,171,782 | 10/1979 | Rumpf | 242/107.4 D |
| 4,350,313 | 9/1982 | Adomeit | 242/107.4 C |

FOREIGN PATENT DOCUMENTS

2113529 8/1983 United Kingdom ........ 242/107.4 A

Primary Examiner—Stuart S. Levy
Assistant Examiner—Katherine Jaekel
Attorney, Agent, or Firm—Hayes, Davis & Soloway

[57] ABSTRACT

The main locking mechanism of an emergency locking retractor comprises teeth on the flanges of the spool on which the belt is wound, the spool being mounted in bearings arranged to permit limited translational movement in a direction perpendicular to the axis of rotation, between a position in which said teeth formations engage with complementary teeth on the frame of the retractor. Actuating means which are arranged to cause movement of the spool into its engaged position, comprise a ratchet wheel mounted on the spool for rotation and translational movement therewith, a pivotally mounted control member and a pawl which can be moved by a ball-in-saucer sensor into a position in which it couples the control member to the ratchet wheel, so that angular movement of the ratchet wheel in the belt unwinding direction causes angular movement of the control member about a pivot, thus moving the spool so as to bring the teeth on the flanges into locking engagement with the teeth on the frame.

14 Claims, 11 Drawing Figures

SAFETY BELT EMERGENCY LOCKING RETRACTOR

This invention relates to an emergency locking retractor for a vehicle safety belt.

Patent Specification No. GB-A-1592713 discloses an emergency locking retractor comprising a pair of mutually parallel frame members, a spool comprising a shaft to receive the belt and a respective disc adjacent to each end of the shaft, each disc having teeth on its periphery, the spool being mounted on the frame members in bearings arranged to permit limited translational movement relative to the frame members, in a direction perpendicular to the axis of rotation, between a position in which said locking formations engage with complementary locking formations on the frame members to inhibit rotation of the spool, resilient means being arranged to bias the spool into its position of disengagement and inertia responsive actuating means being arranged to cause movement of the spool into its engaged position. The present invention is concerned with the provision of improved actuating means for a retractor of this type.

According to the invention, the actuating means comprises a ratchet wheel mounted on the spool for rotation and translational movement therewith, a pivotally mounted control member, inertia responsive means for coupling the control member to the ratchet wheel so that angular movement of the ratchet wheel in the belt unwinding direction causes angular movement of the control member, such angular movement of the control member being arranged to cause movement of the spool into locking engagement with the frame members, the control member moving with the spool.

In one form of the invention, the pivotal mounting for the control member is formed by the shaft and a lever is pivotally mounted on one of the frame members and coupled to the control member by a follower engageable with a cam surface so that angular movement of the control member causes the lever to engage with the teeth on one of the discs of the spool.

In another form of the invention, the control member is pivotally mounted on one of the frame members for angular movement about a pivot point which is displaced from the spool axis in a direction perpendicular to the direction of movement of the spool into locking engagement, the spool being journaled in the control member whereby angular movement of the latter causes movement of the spool into locking engagement.

The means for coupling the control member to the ratchet wheel may comprise a pawl pivotally mounted on the control member. This pawl is preferably provided with an abutment surface adjacent to its tip. A stop is positioned on the control member so as to engage with this abutment surface when the tip is in engagement with the ratchet wheel thereby relieving the resulting load on the pivot of the pawl.

Hold-off means may be arranged to engage with the pawl to keep it out of engagement with the ratchet wheel when the spool is rotating in the retraction direction, such hold-off means being so arranged as to be overridden in the event that the horizontal acceleration to which the inertia sensor is subject exceeds a predetermined value.

The actuating means may be enclosed in a pre-assembled cassette which can then be secured to the outside of one of the frame members. A retraction spring may be accommodated in a similar cassette secured to the other frame member. The cassette may incorporate sliding bearings for the spool. These bearings preferably include surfaces which are in sliding engagement with a radially extending part of the cassette enclosure so as to provide a substantially dust-proof seal to prevent entry of dust into either cassette.

The control member may incorporate a bearing which receives a sleeve formed integrally with the ratchet wheel, the sleeve also serving to connect the ratchet wheel to the shaft of the spool. Since both the control member and the ratchet wheel can conveniently be moulded from plastics material, this arrangement enables a plastic-to-plastic bearing to be provided.

The inertia responsive means may include an inertia disc journaled on the stub axle and coupled to the ratchet wheel by a spring. When the inertia disc lags behind the ratchet wheel against the action of the spring, as a result of sudden acceleration of the ratchet wheel, a pawl, carried by the ratchet wheel, moves outwardly into engagement with ratchet teeth formed on the control member. Since, in the second form of the invention, such a pawl might be actuated to move radially outwardly when relatively close to the pivot point at which the control member is attached to the adjacent frame member, at least two such symmetrically spaced pawls are preferably provided and the mechanism is so arranged that no pawl can come into locking engagement with the ratchet teeth on the control member while it is at less than a predetermined distance from said pivot point.

In order to increase the width of the teeth both on the ratchet wheel and on the control member without increasing the overall axial length of the retractor, the two sets of teeth are preferably nested one within another so that the outwardly facing teeth on the ratchet wheel overlie the inwardly facing ratchet teeth on the control member. In order to reduce any risk of locking being inhibited by the pawl tips being disposed at an angle to such relatively wide ratchet teeth, either or both of the ratchet teeth and the pawl may be formed with their tips inclined to the axis of the shaft so as to ensure that engagement commences on one side before there is any risk of tooth tips being crossed.

The various components of the actuating means are preferably so arranged relative to one another that the locking formations on the spool are in synchronism with the complementary locking formations on the frame members when they are brought into mutual engagement.

Two embodiments of the invention will now be described, by way of example, with reference to the accompanying drawings, in which.

Figure 1:
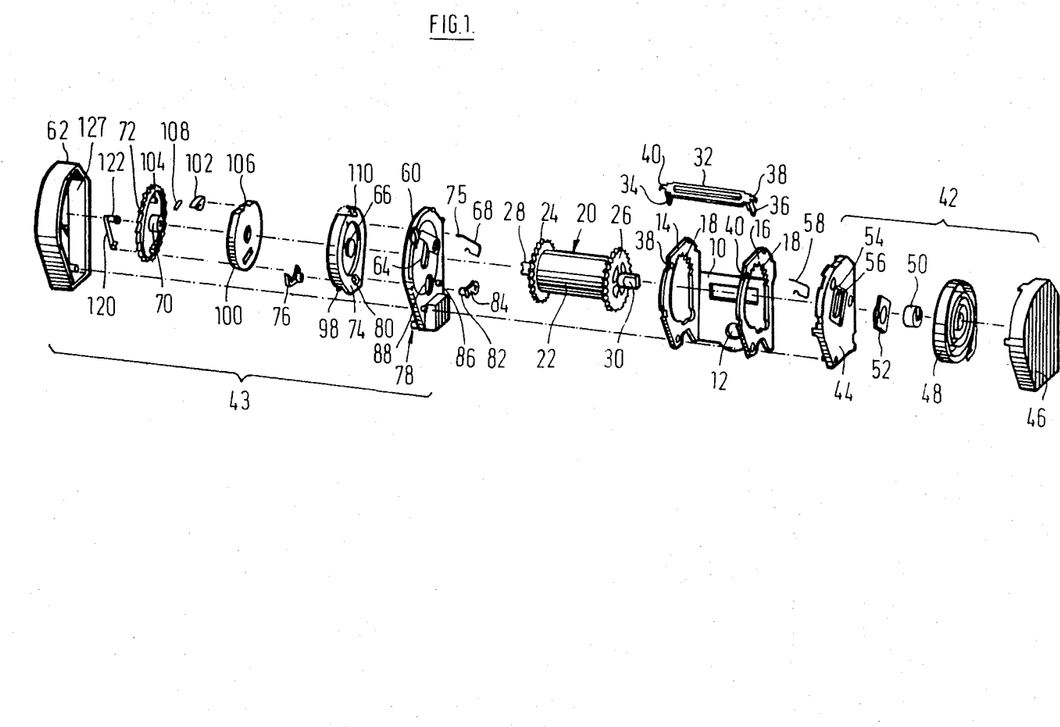
FIG. 1 is an exploded perspective view of an emergency locking retractor in accordance with a first embodiment of the invention.

The retractor illustrated in FIG. 1 has a generally U-shaped frame 10, the base portion of which is provided with a hole 12 whereby the frame 10 may be secured to the body of a motor vehicle. The side limbs of the U-shaped constitute substantially identical frame members 14 and 16 each of which contains a generally circular aperture having a respective toothed segment 18 forming part of its upper periphery. The bottoms of the circular apertures are enlarged by being squared-off so as to accommodate parts of the mechanism which will be described hereinafter.

A spool 20 is mounted in the frame 10. The spool 20 comprises a central shaft portion 22, on which a safety belt may be wound, two toothed discs 24 and 26, for engagement with the toothed segments 18 on the frame members 14 and 16 respectively, and two projecting stub axles 28 and 30.

A distance bar 32 having perpendicularly projecting side limbs 34 and 36, extends between notches 38 and 40 in the outer edges of the frame members 14 and 16 so as to maintain the required spacing therebetween. The end limbs 34 and 36 project beyond the edges of the openings in the frame members 14 and 16 so as to overlap the toothed discs 24 and 26 of the spool and prevent axial displacement thereof. In addition, the distance bar 32 has respective hook formations 38 and 40 on its two ends which serve to retain a retractor spring cassette 42 in engagement with the outer side face of the frame member 16 and a locking mechanism cassette 43 in engagement with the outer side face of the frame member 14.

The enclosure for the retractor spring cassette 42 comprises an end member 44, which abuts the frame member 16 and is engaged by the hook formation 38, together with a cover 46 which carries a stop (not shown) to which the outer end of a retractor spring 48 is secured. The inner end of the spring 48 is secured to a plastics boss 50 having a cylindrical outer surface and a slotted opening for engagement with the flattened end of the stub axle 30 of the spool 20. The axial length of the boss 50 is greater than the width of the spring 48 so as to be long enough for one end thereof to project into an opening in a plastics bearing plate 52 which is slidably mounted in an elongate recess 54 in the surface of the end plate 44. Centrally disposed within the recess 54 is an elongate slot 56 through which project the stub axle 30 and a boss on the bearing plate 52. The lengths of the recess 54 and the slot 56 are such that the bearing plate 52 can slide between a position in which the teeth on the disc 26 engage with the toothed segments 18 on the end plate 16 and a position in which they are clear of such engagement. A spring 58 engages with a formation on the bearing plate 52 to bias it into the disengaged position.

The locking mechanism cassette 43 is enclosed by an end plate 60, which abuts the outer face of the frame member 14 and is engaged by the hook formation 40 on the distance bar 32, together with a cover 62. The end plate 60 has an elongate slot 64 and a sliding bearing 66, which is spring biased away from the toothed segments 18 on the end plate 14 by a spring 68, in a similar manner to the corresponding components of the retractor spring cassette 42. However, in the locking mechanism cassette 43, the boss 50 is replaced by a stub axle 70 which is rigidly attached to a ratchet wheel 72, the stub axle 70 having a cylindrical outer surface for engagement in the bearing 66 and a slot for engagement with the flattened end portion of the stub axle 28 of the spool 20.

The sliding bearing 66 is an integral part of a control member 74 which is subject to an angular bias in the belt retraction direction by an extended limb 75 of the spring 68. A pawl 76 is pivotally mounted on the control member 74 so that it can be moved into engagement with the teeth of the ratchet wheel 72 by a conventional ball-in-saucer inertia sensing mechanism 78 mounted on the bottom of the end plate 60. The control member 74 also has an elongate slot 80 which engages with a projection 82 on a blocking pawl 84, which, in turn, is pivotally mounted on a pin 86 secured to the side of the end plate 60 facing the frame member 14. The end plate 60 has an elongate opening 88 through which the formation 82 projects.

FIGS. 2 to 5 show the locking mechanism schematically and some of the components illustrated therein have been broken away or modified as compared with FIG. 1, while others have been omitted, to enable the operation of the mechanism to be seen more clearly. It will be seen that the inertia sensing mechanism 78 comprises a carrier 90, which includes a saucer for a ball 92. The carrier 90 is secured to the end plate 60 and has a ball follower lever 94 pivotally mounted on a projecting part thereof. The follower lever 94 engages with the pawl 76. The direction of rotation to wind the safety belt on to the spool is anti-clockwise.

Figure 2:
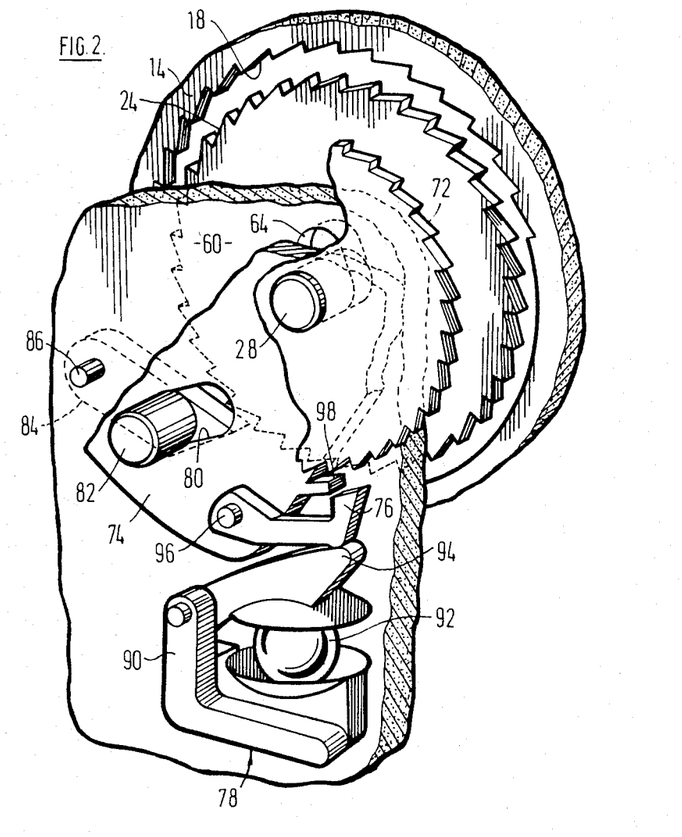
FIG. 2 is a schematic perspective diagram showing the inertia sensing mechanism in its released position.

The operation of the locking mechanism is as follows. When any horizontal acceleration to which the retractor is subject, is below the threshold level at which actuation of the locking mechanism is required, the ball 92 remains in the centre of its saucer and the pawl 76 is out of engagement with the ratchet wheel 72, as shown in FIG. 2.

Figure 3:
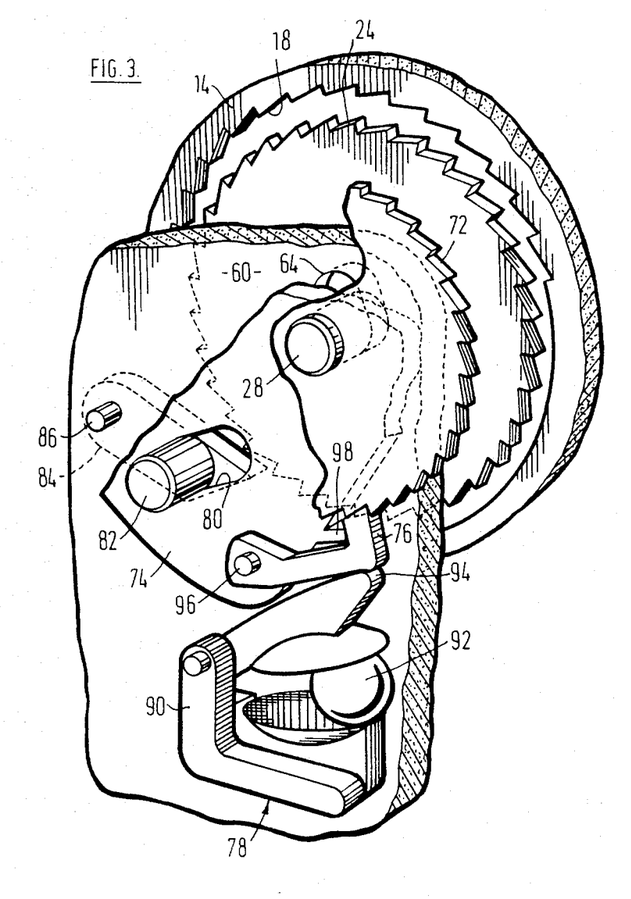
FIG. 3 is a view similar to FIG. 2 showing the sensing mechanism in a preliminary locking position.
Figure 4:
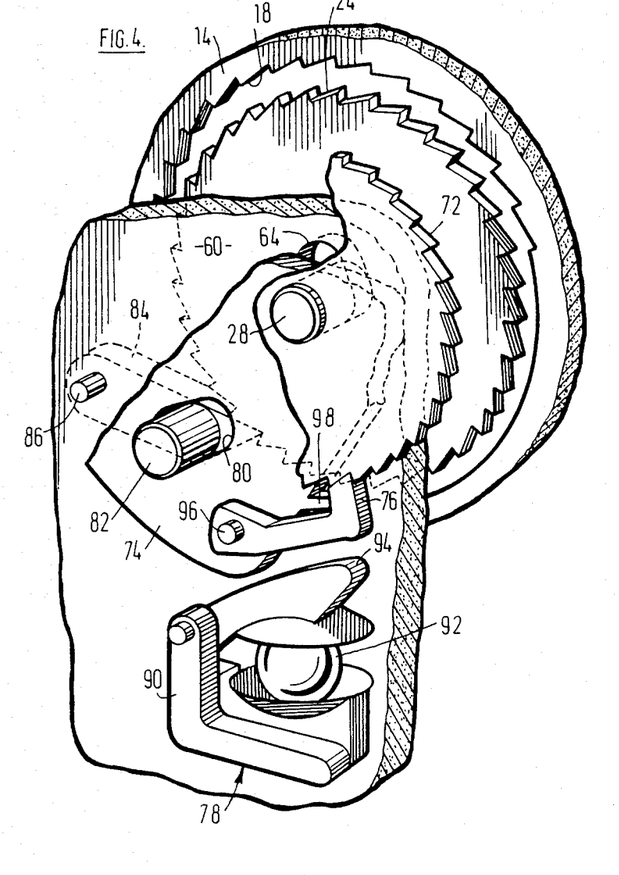
FIG. 4 is a view similar to FIGS. 2 and 3 showing the sensing mechanism in its fully blocked position prior to engagement of the main locking mechanism.
Figure 5:
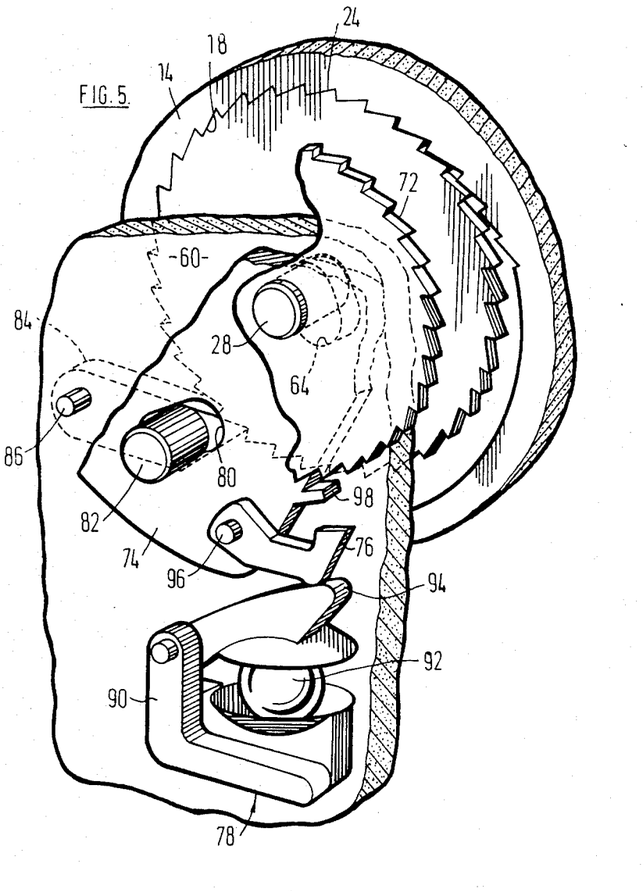
FIG. 5 is a view similar to FIGS. 2, 3 and 4 showing the mechanism in its fully locked position.

Turning to FIG. 3, when the above-mentioned threshold level of acceleration is exceeded, the ball 92 is displaced to nearer the edge of its saucer, lifting the lever 94 so that the pawl 76 is moved into engagement with the ratchet wheel 72. As already mentioned, the ratchet wheel 72 is fast with the spool 20 and consequently any withdrawal of the safety belt from the spool 20 will cause clockwise angular movement of the ratchet wheel 72 (as viewed in FIGS. 2 to 5) and this angular movement is transmitted by the pawl 76 to the control plate 74. As shown in FIG. 4, such angular movement of the control plate 74 results in the blocking pawl 84 pivoting into engagement with the toothed disc 24 of the spool 20 so as to block angular movement of the latter about its stub axles 28 and 30. Assuming that there is continued tension in the safety belt, the spool 20 pivots on the tip of the blocking pawl 84, the bearing plates 52 and 66 sliding along the slots 56 and 64 against the action of the springs 58 and 68 (FIG. 1) until the teeth of the disc 24 and 26 come into engagement with the toothed segments 18 on the frame members 14 and 16, as illustrated in FIG. 5. It will be appreciated that, once clockwise angular movement of the control plate 74 has commenced, the mechanism will move into and then remain in its fully locked position until tension in the safety belt is removed, even if the ball 92 has returned to its central position in its saucer.

The pivot axle 96 is relieved of the load imposed on the pawl 76 during the locking by a stop 98 formed as a projection of control member 74 (FIG. 1) behind the tip of the pawl 76. As can best be seen from FIG. 4, the back of the tip of the pawl 76 engages with the stop 98 when the pawl has moved into its locking position. The pawl 76 is preferably a loose fit on its pivot axle 96 in order to facilitate this action.

Reverting to FIG. 1, the locking mechanism cassette 43 also includes a belt-pull-sensitive actuating mechanism which is of conventional type and which is not shown in FIGS. 2 to 5. Briefly, the belt-pull-sensitive locking mechanism consists of an inertia disc 100 which is pivotally mounted on the stub axle 70 of the ratchet wheel 72 and a pawl 102 which is pivotally mounted on a pin 104 secured to one side face of the ratchet wheel 72 adjacent to its periphery. The inertia disc 100 has a pin 106 which engages in a slot in the pawl 102 to cause the latter to move outwardly, if the inertia disc 100 lags behind the ratchet wheel 72, against the action of a spring 108, when the belt is being withdrawn from the spool 20. If the belt is accelerated in the withdrawal direction, the disc 100 has sufficient inertia to overcome the action of the spring 108 with the result that the pawl 102 moves outwardly into engagement with internal ratchet teeth 110 formed on a flange projecting from the control member 74 so that the latter is thereby coupled to the ratchet wheel 72. Continued withdrawal of the belt then causes angular movement of the control plate 74 and locking of the mechanism proceeds as described above with reference to FIGS. 4 and 5.

If the ball 92 was to bounce on its saucer during driving over rough surfaces, the pawl 76 would bounce against the teeth of the ratchet wheel 72 and this could be an undesirable source of noise. In order to prevent this, a hold-off lever 120 (FIGS 1 and 6) is arranged with one end 122 disposed at right-angles to the rest of the lever 120 and received as a frictional fit in an axial bore in the outer end of the stub axle 70 of the ratchet wheel 72. The other end of the lever 120 carries a pointed projection 124 positioned to engage in a correspondingly shaped notch 126 in the heel of the pawl 76. In use, when the safety belt is being withdrawn from the spool 20, the ratchet wheel 72 carries the lever 120 in the clockwise direction until its outer end abuts against the interior of the side wall 127 of the cover 62. The end 122 then slips in its bore as rotation of the ratchet wheel 72 continues. The pawl 76 is free to move into its engaged position.

Figure 6:
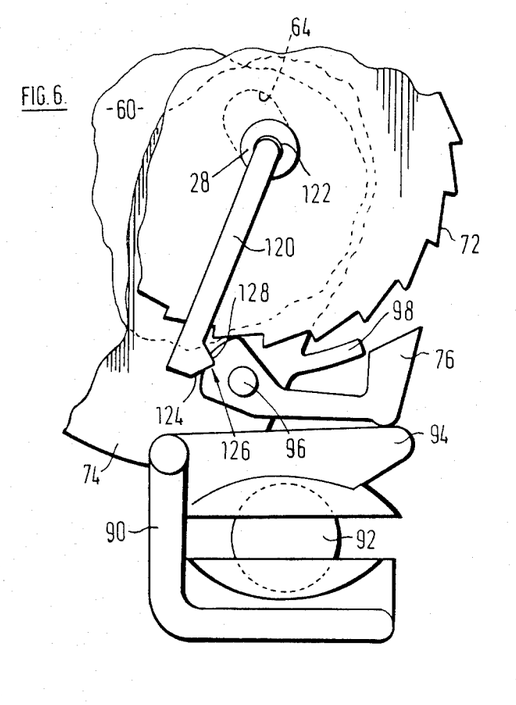
FIG. 6 is a schematic end view showing the inertia sensing mechanism in more detail.

On the other hand, when the safety belt is being wound on the spool 20, the ratchet wheel 72 turns in an anti-clockwise direction and the lever 120 is carried round until the projection 124 engages in the notch 126, holding the pawl 76 in its disengaged position. However, in accordance with a feature of the invention, the upper surface 128 of the notch 126 is arranged at such an angle to the radial direction from the pivot axle 96 of the pawl 76 that, if the horizontal acceleration to which the ball 92 is subject exceeds a predetermined threshold value, for example between 3g and 5g, the frictional engagement of the end 122 in its bore is overcome and the lever 120 displaced to push the projection 124 out of the notch 126, allowing the pawl 76 to move into engagement with the ratchet wheel 72. Consequently, locking of the mechanism commences as soon as excessive horizontal acceleration is sensed by the ball 92 even if the body of a wearer of the safety belt has not started to move in such a manner as to withdraw the safety belt from the spool 20.

Figure 7:
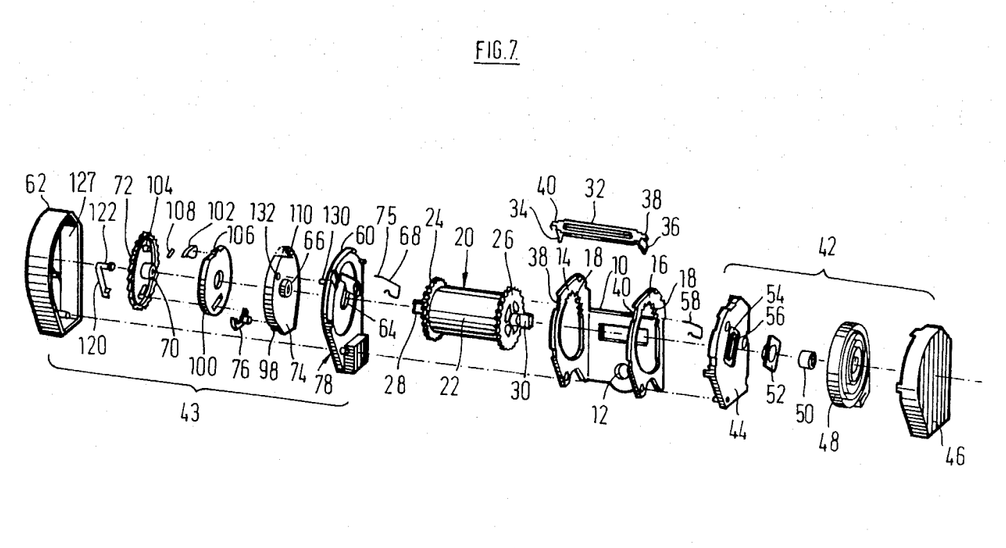
FIG. 7 is an exploded perspective view, similar to FIG. 1, of a second embodiment of the invention.

The retractor illustrated in FIG. 7 is generally similar to that illustrated in FIG. 1. Components which are substantially identical are denoted by the same reference numerals and will not be described again in detail.

Figure 8:
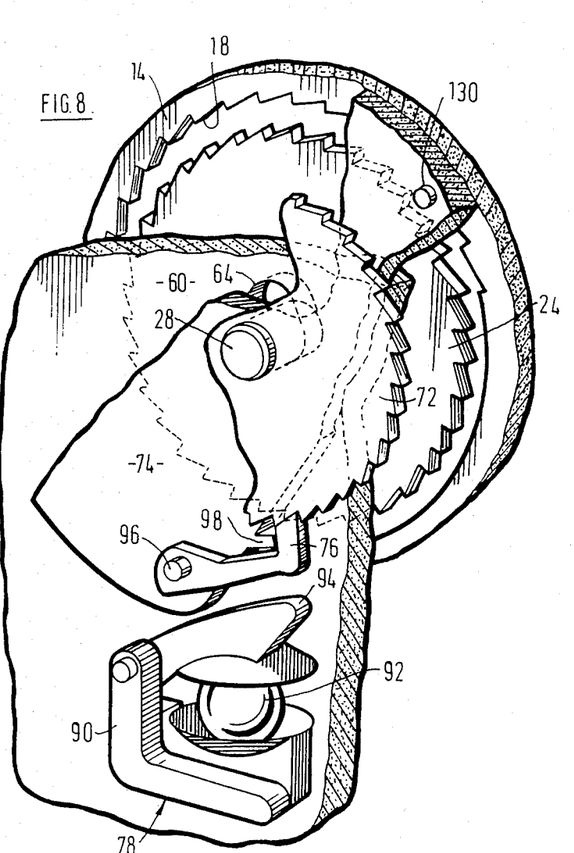
FIGS. 8 and 9 are schematic perspective diagrams, similar to FIGS. 4 and 5, of the embodiment shown in FIG. 6.
Figure 9:
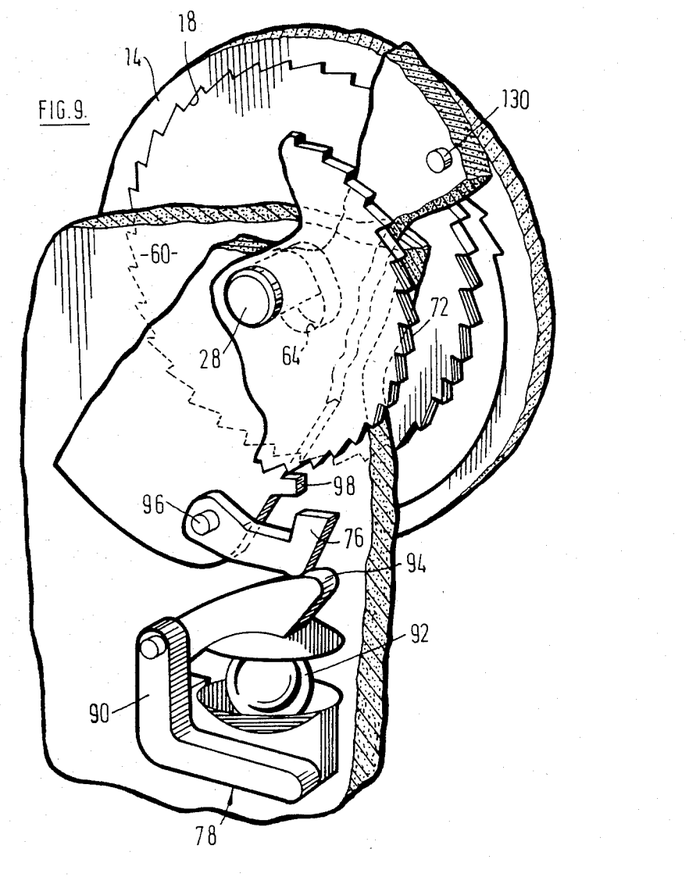

The operation of the locking mechanism of the retractor shown in FIG. 7 is similar to that of the retractor shown in FIG. 1 in that either the vehicle sensitive inertia sensing mechanism 78 or the inertia disc 100 may cause the ratchet wheel 72 to be coupled to the control plate 74. However the control plate 74, instead of being free to perform limited angular movement about the shaft 28, is pivotally mounted on the end plate 60 by means of a pivot pin 130 which engages in a hole 132. The pin 130 is located at the apex of an isosceles triangle of which the longitudinal axis of the slot 64 forms the base, as can be seen from FIGS. 8 and 9. Consequently, when the control plate 74 is coupled to the ratchet wheel 72 and angular movement of the latter continues in the belt unwinding direction, the control plate 74 pivots about the pin 130, moving the shaft 28 along the slot 64, bringing the toothed discs 24 and 26 into engagement with the toothed segments 18. The pawl 84 of FIG. 1 is therefore unnecessary. As a result, it is no longer necessary to provide the opening 88 in the end plate 60 and consequently it is easier to seal the cassette 43 against dust and debris which could interfere with the operation of the mechanism.

Figure 10:
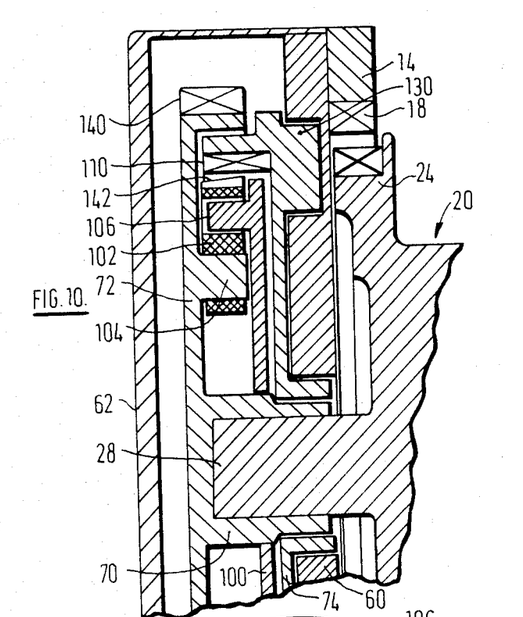
FIG. 10 is a fragmentary cross-sectional view of part of the locking mechanism of the retractor shown in FIG. 7.

One potential disadvantage of the embodiment of the invention illustrated in FIG. 7 is that a greater proportion of the initial locking load necessary to displace the spool 20 is taken by either the pawl 76 or the pawl 102. It is therefore desirable to make these pawls, and the ratchet teeth with which they engage, relatively wide. Referring to FIG. 10, the teeth of the ratchet wheel 72 are formed on a cylindrical flange 140 within which is accommodated the flange of the control plate 74 which carries the ratchet teeth 110, together with the pawl 102. With this arrangement, the width of both sets of ratchet teeth can be substantially increased without a corresponding increase in the overall axial length of the retractor. However, if the pawl 102 was to twist on its pivots 104 and 106, its tip could rest at an angle across the tip of one of the ratchet teeth 110. In order to avoid any risk of this, the tip 142 of the pawl 102 is sloped, as illustrated in FIG. 10, so that the end nearer the spool is always the first to come into engagement with the teeth 110. The tip of the other pawl 76 (not shown in FIG. 10) is similarly shaped.

The features illustrated in FIG. 10 can also be used with the embodiment of FIGS. 1 to 6

Figure 11:
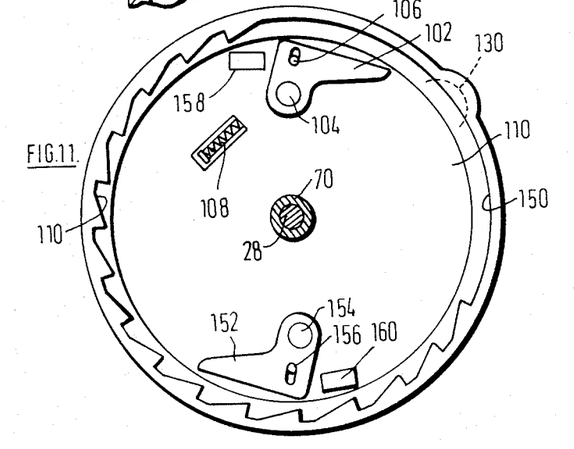
FIG. 11 is an end view of some of the components of the locking mechanism of the embodiment shown in FIG. 7.

Turning now to FIG. 11, it will be appreciated that although the orientation of the pawl 76 relative to the pivot pin 130 is controlled, there is no equivalent control on the orientation of the pawl 102. If the pawl 102 were to come into engagement with the ratchet teeth 110 close to the pin 130, substantial loads would be imposed. In order to avoid this, the ratchet teeth 110 are omitted over a sector 150 extending over about 60° on each side of the pivot pin 130 and a second pawl 152 is mounted on a pivot pin 154 diametrically opposite the pivot pin 104. The pawl 152 is coupled to the inertia disc 100 by a pin 156 similar to the pin 106. Thus, if the locking mechanism is actuated when one of the pawls 102 and 152 is more than 120° from the pivot pin 130, that pawl takes the entire load, the other pawl being aligned with the segment 150. On the other hand, should locking be initiated when both pawls are less than 120° from the pivot pin 130, the load is shared between the two pawls. Both pawls have their tips disposed at an angle to the line between the pivot points 104,106 and 154,156 respectively so as to amplify the relative movement between the ratchet wheel 72 and the inertia disc 100. In addition, both pawls are provided with respective stops 158 and 160 in a similar manner to the stop for the pawl 76.

I claim:

1. An emergency locking retractor comprising a pair of mutually parallel frame members, a spool comprising a shaft to receive the belt, a respective disc, having teeth on its periphery, mounted adjacent to each end of the shaft, complementary locking formations on the frame members, bearing rotatably mounting the spool on the frame members so as to permit limited translational movement of the spool relative to the frame members in a direction perpendicular to the axis of rotation of said spool between an engaged position in which said teeth of said disc engage with said complementary locking formations on the frame members to inhibit rotation of the spool and a disengaged position in which the spool is free to rotate, resilient means biasing the spool into its disengaged position, and inertia responsive actuating means arranged to cause movement of the spool into its engaged position, wherein the actuating means comprises a rachet wheel mounted on the spool for rotation and translational movement therewith, a pivotally mounted control member, a pawl pivotally mounted on one of the control member and the ratchet wheel, ratchet teeth on the other of the control member and the ratchet wheel, and inertia responsive means for moving the pawl into engagement with the ratchet teeth so that angular movement of the ratchet wheel in the belt unwinding direction causes angular movement of the control member, such angular movement of the control member being arranged to cause movement of the spool into locking engagement with the frame members, the control member moving with the spool as the latter moves into locking engagement.

2. A retractor according to claim 1, wherein the pivotal mounting for the control member is formed by the shaft of the spool and a lever is pivotally mounted on one of the frame members and coupled to the control member by a follower engageable with a cam surface so that angular movement of the control member causes the lever to engage with the teeth on one of the discs of the spool.

3. A retractor according to claim 1, wherein the control member is pivotally mounted on one of the frame members for angular movement about a pivot point which is displaced from the spool axis in a direction perpendicular to the direction of movement of the spool into locking engagement, the spool being journaled in the control member whereby angular movement of the latter causes movement of the spool into locking engagement.

4. A retractor according to claim 3, wherein the inertia responsive means includes an inertia disc mounted for rotation about the axis of the spool and coupled to the ratchet wheel by a spring, at least two pawls being pivotally monted on one of the ratchet wheel and the inertia disc at positions symmetrically located relative to the axis of the spool, ratchet teeth on the other of the ratchet wheel and the inertia disc extending only over a sector angularly spaced from the pivot point of the control member, and camming means on the other of the ratchet wheel and the inertia disc arranged to move the pawls into engagement with said ratchet teeth if the inertia disc lags behind the ratchet wheel against the action of the spring, as a result of sudden acceleration of the ratchet wheel.

5. A retractor according to claim 4, wherein each of said two pawls has an abutment surface adjacent to its tip and a stop is positioned on the control member so as to engage with this abutment surface when the tip of the pawl is in engagement with the ratchet wheel.

6. A retractor according to claim 1, further comprising hold-off means arranged to engage with the pawl to keep it out of engagement with the ratchet wheel when the spool is rotating in the retraction direction, and means for overriding said hold-off means in the event that the sensor of the inertia-responsive actuating means is subject to a horizontal acceleration exceeding a predetermined value.

7. A retractor according to claim 1, wherein the actuating means is enclosed in a pre-assembled cassette which is secured to the outside of one of the frame members and a retraction spring is accommodated in a similar cassette secured to the other frame member, each cassette incorporating sliding bearings for the spool, such bearings having surfaces which are in sliding engagement with a radially extending part of each such cassette.

8. A retractor accordig to claim 1, wherein the control member incorporates a bearing which receives a sleeve formed integrally with the ratchet wheel, the sleeve also serving to connect the ratchet wheel to the shaft of the spool.

9. A retractor according to claim 2, further comprising hold-off means arranged to engage with the pawl to keep it out of engagement with the ratchet wheel when the spool is rotating in the retraction direction, and means for overriding said hold-off means in the event that the sensor of the inertia-responsive actuating means is subject to a horizontal acceleration exceeding a predetermined value.

10. A retractor according to claim 2, wherein the actuating means is enclosed in a pre-assembled cassette which is secured to the outside of one of the frame members and a retraction spring is accommodated in a similar cassette secured to the other frame member, each cassette incorporating sliding bearings for the spool, such bearings having surfaces which are in sliding engagement with a radially extending part of each such cassette.

11. A retractor according to claim 2, wherein the control member incorporates a bearing which receives a sleeve formed integrally with the ratchet wheel, the sleeve also serving to connect the ratchet wheel to the shaft of the spool.

12. A retractor according to claim 3, further comprising hold-off means arranged to engage with the pawl to keep it out of engagement with the ratchet wheel when the spool is rotating in the retraction direction, and means for overriding said hold-off means in the event that the sensor of the inertia-responsive actuating means is subject to a horizontal acceleration exceeding a predetermined value.

13. A retractor according to claim 3, wherein the actuating means is enclosed in a pre-assembled cassette which is secured to the outside of one of the frame members and a retraction spring is accommodated in a similar cassette secured to the other frame member, each cassette incorporating sliding bearings for the spool, such bearings having surfaces which are in sliding engagement with a radially extending part of each such cassette.

14. A retractor according to claim 3, wherein the control member incorporates a bearing which receives a sleeve formed integrally with the ratchet wheel, the sleeve also serving to connect the ratchet wheel to the shaft of the spool.

* * * * *

UNITED STATES PATENT AND TRADEMARK OFFICE
CERTIFICATE OF CORRECTION

PATENT NO. : 4,522,350
DATED : June 11, 1985
INVENTOR(S) : Hans-Hellmut ERNST

It is certified that error appears in the above-identified patent and that said Letters Patent are hereby corrected as shown below:

Claim 1, line 17, column 7, "bearing" should be --Bearings--

Claim 8, line 29, column 8, "accordig" should be --according--

Signed and Sealed this

Twenty-fourth Day of September 1985

[SEAL]

Attest:

Attesting Officer

DONALD J. QUIGG

Commissioner of Patents and Trademarks—Designate

REEXAMINATION CERTIFICATE (1743rd)

United States Patent [19]

Ernst

[11] B1 4,522,350

[45] Certificate Issued Jul. 14, 1992

[54] SAFETY BELT EMERGENCY LOCKING RETRACTOR

[75] Inventor: Hans-Hellmut Ernst, Sulfeld, Fed. Rep. of Germany

[73] Assignee: Britax-Kolb GmbH & Co., Erdweg, Fed. Rep. of Germany

Reexamination Request:
No. 90/002,220, Dec. 7, 1990

Reexamination Certificate for:
Patent No.: 4,522,350
Issued: Jun. 11, 1985
Appl. No.: 551,946
Filed: Nov. 15, 1983

Certificate of Correction issued Sep. 24, 1985.

[30] Foreign Application Priority Data

Nov. 20, 1982 [GB] United Kingdom ............... 8233186
Jan. 5, 1983 [GB] United Kingdom ............... 8300178

[51] Int. Cl.⁵ .................................................. B65H 75/48
[52] U.S. Cl. ...................... 242/107.4 A; 242/107.4 C
[58] Field of Search ............. 242/107.4 C, 107.4 A, 242/107.4 D, 107.4 B; 280/806; 297/478, 480

[56] References Cited

U.S. PATENT DOCUMENTS

| | | |
|---|---|---|
| 3,074,761 | 1/1963 | Ryan . |
| 3,138,405 | 6/1964 | Hanway . |
| 3,237,879 | 3/1966 | Whittingham . |
| 3,273,822 | 9/1966 | Merrel et al. . |
| 3,343,765 | 9/1967 | Baker ........................... 242/107.4 R |
| 3,467,337 | 9/1969 | Putman . |
| 3,659,800 | 5/1972 | Meyer . |
| 3,851,837 | 12/1974 | Griffin . |
| 3,876,164 | 4/1975 | Dully . |
| 3,889,898 | 6/1975 | Ziv . |
| 4,083,512 | 4/1978 | Rumpf . |
| 4,090,678 | 5/1978 | Yamanashi . |
| 4,190,213 | 2/1980 | Ueda . |
| 4,249,708 | 2/1981 | Asano . |
| 4,350,313 | 9/1982 | Adomert . |
| 4,366,934 | 1/1983 | Seifert et al. . |
| 4,422,594 | 12/1983 | Honl ........................... 242/107.4 A |
| 4,437,623 | 3/1984 | Wyder . |
| 4,467,980 | 8/1984 | Fohl . |
| 4,470,557 | 9/1984 | Ernst . |

FOREIGN PATENT DOCUMENTS

| | | |
|---|---|---|
| 1131603 | 9/1982 | Canada . |
| 2646238 | of 0000 | Fed. Rep. of Germany . |
| 1531545 | 1/1970 | Fed. Rep. of Germany . |
| 1531546 | 1/1970 | Fed. Rep. of Germany . |
| 2832159 | 1/1980 | Fed. Rep. of Germany . |
| 3011283 | 1/1981 | Fed. Rep. of Germany . |
| 3017097 | 11/1981 | Fed. Rep. of Germany . |

*Primary Examiner*—Katherine Matecki

[57] ABSTRACT

The main locking mechanism of an emergency locking retractor comprises teeth on the flanges of the spool on which the belt is wound, the spool being mounted in bearings arranged to permit limited translational movement in a direction perpendicular to the axis of rotation, between a position in which said teeth formations engage with complementary teeth on the frame of the retractor. Actuating means which are arranged to cause movement of the spool into its engaged position, comprise a ratchet wheel mounted on the spool for rotation and translational movement therewith, a pivotally mounted control member and a pawl which can be moved by a ball-in-saucer sensor into a position in which it couples the control member to the ratchet wheel, so that angular movement of the ratchet wheel in the belt unwinding direction causes angular movement of the control member about a pivot, thus moving the spool so as to bring the teeth on the flanges into locking engagement with the teeth on the frame.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3 lines 27–40:
A distance bar 32 having perpendicularly projecting side limbs 34 and 36, extends between notches 38 and 40 in the outer edges of the frame members 14 and 16 so as to maintain the required spacing there between. The end limbs 34 and 36 project beyond the edges of the openings in the frame members 14 and 16 so as to overlap the toothed discs 24 and 26 of the spool and prevent axial displacement thereof. In addition, the distance bar 32 has respective hook formations 38' and 40' on its two ends which serve to retain a retractor spring cassette 42 in engagement with the outer side face of the frame member 16 and a locking mechanism cassette 43 in engagement with the outer side face of the frame member 14.

The drawing figures have been changed as follows: In FIGS. 1 and 7, reference numerals 38 and 40 have been changed to 38' and 40' where they indicate the hook formations on the ends of bar 32.

AS A RESULT OF REEXAMINATION IT HAS BEEN DETERMINED THAT:

The patentability of claims 2–7 and 9–14 is confirmed.

Claim 1 is cancelled.

Claim 8 is determined to be patentable as amended.

New claims 15–21 are added and determined to be patentable.

8. A retractor [accordig] *according* to claim [1] *15*, wherein the control member incorporates a bearing which receives a sleeve formed integrally with the ratchet wheel, the sleeve also serving to connect the ratchet wheel to the shaft of the spool.

*15. An emergency locking retractor comprising a pair of mutually parallel frame members, a spool comprising a shaft to receive a belt, a respective disc, having teeth on its periphery, mounted adjacent to each end of the shaft and fixed with respect thereto, complementary locking formations located on the frame members radially outwardly of the teeth on each of said discs, the teeth of each of said discs being free of engagement of all structure of the retractor except said locking formations during all operating conditions of said retractor, bearings rotatably mounting each end of the shaft of the spool on the frame members for limited translational movement of the spool and discs relative to the frame members along a predetermined path located in a plane extending perpendicular to the axis of rotation of said spool, said spool and discs being movable along said predetermined path between a spool engaged position in which said teeth of said discs lockingly engage with said complementary locking formations on the frame members to inhibit rotation of the spool and a spool disengaged position in which the spool is free to rotate, resilient means biasing the spool into its disengaged position, and inertia responsive actuating means arranged to cause movement of the spool into its engaged position, wherein the actuating means comprises a ratchet wheel mounted on one end of the shaft of the spool for rotation and translational movement therewith between said spool engaged and disengaged positions, a pivotally mounted control member with said one end of the shaft of the spool operatively connected thereto for said translational movement along said predetermined path between said spool engaged and disengaged positions, a pawl pivotally mounted on one of the control member and the ratchet wheel, ratchet teeth on the other of the control member and the ratchet wheel, and inertia responsive means located in operative relation with said pawl for moving the pawl into engagement with the ratchet teeth to couple said ratchet wheel to said control member against relative movement so that further angular movement of the ratchet wheel in the belt unwinding direction causes angular movement of the control member, together with said translational movement of the spool and discs along said predetermined path from said spool disengaged position to said spool engaged position with the teeth of the discs in locking engagement with the complementary locking formations on the frame members.*

*16. An emergency locking retractor for a vehicle comprising a pair of mutually parallel frame members, a spool comprising a shaft to receive a belt, a respective disc, having teeth on its periphery, mounted adjacent to each end of the shaft and fixed with respect thereto, complementary locking formations located on the frame members radially outwardly of the teeth on each of said discs, the teeth of each of said discs being free of engagement of all structure of the retractor except said locking formations during all operating conditions of said retractor, bearings rotatably mounting each end of the shaft of the spool on the frame members for limited translational movement of the spool and discs relative to the frame members along a predetermined path located in a plane extending perpendicular to the axis of rotation of said spool, said spool and discs being movable along said predetermined path between a spool engaged position in which said teeth of said discs lockingly engage with said complementary locking formations on the frame members to inhibit rotation of the spool and a spool disengaged position in which the spool is free to rotate, resilient means biasing the spool into its disengaged position, and inertia responsive actuating means arranged to cause movement of the spool into its engaged position, wherein the actuating means comprises a ratchet wheel mounted on one end of the shaft of the spool for rotation and translational movement therewith between said spool engaged and disengaged positions, a pivotally mounted control member with said one end of the shaft of the spool operatively connected thereto for said translational movement along said predetermined path between said spool engaged and disengaged positions, a pawl pivotally mounted on each of the control member and the ratchet wheel, ratchet teeth on each of the control member and the ratchet wheel, and inertia responsive means located in operative relation with each said pawl for selectively moving each pawl into engagement with one of the ratchet teeth to couple said ratchet wheel to said control member against* relative movement so that further angular movement of the ratchet wheel in the belt unwinding direction causes angular movement of the control member, together with said translational movement of the spool and discs along said predetermined path from said spool disengaged position to said spool engaged position with the teeth of the discs in locking engagement with the complementary locking formations on the frame members, one of said inertia responsive means being responsive to sudden acceleration of the ratchet wheel as caused by withdrawal of the belt and the other of said inertia responsive means being responsive to movement of the vehicle.

17. An emergency locking retractor comprising a pair of mutually parallel frame members, a spool comprising a shaft to receive a belt, a respective disc, having teeth on its periphery, mounted adjacent to each end of the shaft and fixed with respect thereto, complementary locking formations located on the frame members radially outwardly of the teeth on each of said discs, the teeth of each of said discs being free of engagement of all structure of the retractor except said locking formations during all operating conditions of said retractor, bearings rotatably mounting each end of the shaft of the spool on the frame members for limited translational movement of the spool and discs relative to the frame members along a predetermined path located in a plane extending perpendicular to the axis of rotation of said spool, said spool and discs being movable along said predetermined path between a spool engaged position in which said teeth of said discs lockingly engage with said complementary locking formations on the frame members to inhibit rotation of the spool and a spool disengaged position in which the spool is free to rotate, resilient means biasing the spool into its disengaged position, and inertia responsive actuating means arranged to cause movement of the spool into its engaged position, wherein the actuating means comprises a ratchet wheel mounted on one end of the shaft of the spool for rotation and translation movement therewith between said spool engaged and disengaged positions, a pivotally mounted control member pivotally mounted for movement about a pivot having a predetermined location with respect to said frame members and with said one end of the shaft of the spool operatively connected thereto for said translational movement along said predetermined path between said spool engaged and disengaged positions, a pawl pivotally mounted on one of the control member and the ratchet wheel, ratchet teeth on the other of the control member and the ratchet wheel, and inertia responsive means located in operative relation with said pawl for moving the pawl into engagement with the ratchet teeth to couple said ratchet wheel to said control member against relative movement so that further angular movement of the ratchet wheel in the belt unwinding direction causes angular movement of the control member, together with said translational movement of the spool and discs along said predetermined path from said spool disengaged position to said spool engaged position, said ratchet teeth when engaged by said pawl being oriented in a predetermined relation with respect to said pawl and said pivot and the teeth of the discs being in spaced predetermined position with the complementary locking formations on said frame members whereby said translational movement of said spool and discs along said predetermined path from said spool disengaged position to said spool engaged position moves the teeth of said discs into synchronous locking engagement with locking formations on said frame members.

18. An emergency locking retractor for a vehicle comprising a pair of mutually parallel frame members, a spool comprising a shaft to receive a belt, a respective disc, having teeth on its periphery, mounted adjacent to each end of the shaft and fixed with respect thereto, complementary locking formations located on the frame members radially outwardly of the teeth on each of said discs, the teeth of each of said discs being free of engagement of all structure of the retractor except said locking formations during all operating conditions of said retractor, bearings rotatably mounting each end of the shaft of the spool on the frame members for limited translational movement of the spool and discs relative to the frame members along a predetermined path located in a plane extending perpendicular to the axis of rotation of said spool, said spool and discs being movable along said predetermined path between a spool engaged position in which said teeth of said discs lockingly engage with said complementary locking formations on the frame members to inhibit rotation of the spool and a spool disengaged position in which the spool is free to rotate, resilient means biasing the spool into its disengaged position, and inertia responsive actuating means arranged to cause movement of the spool into its engaged position, wherein the actuating means comprises a ratchet wheel fixedly mounted on one end of the shaft of the spool for rotation and translational movement therewith between said spool engaged and disengaged positions, a pivotally mounted control member pivotally mounted on one of the frame members for angular movement about a fixed pivot which is displaced from the spool axis in a direction perpendicular to the direction of movement of the spool into said spool engaged position, one end of the shaft of the spool being journaled in the control member for said translational movement along said predetermined path between said spool engaged and disengaged positions upon angular movement of the control member, a pawl pivotally mounted on each of the control member and the ratchet wheel, ratchet teeth on each of the control member and the ratchet wheel, and inertia responsive means located in operative relation with each said pawl for selectively moving each pawl into engagement with one of the ratchet teeth to couple said ratchet wheel to said control member against relative movement, one of said inertia responsive means being responsive to sudden acceleration of the ratchet wheel as caused by withdrawal of the belt and the other of said inertia responsive means being responsive to movement of the vehicle, and said ratchet teeth when engaged by said pawl being oriented in a predetermined relation with respect to said pawl and said fixed pivot and the teeth of the discs being in spaced predetermined position with the complementary locking formations on said frame members so that further angular movement of the ratchet wheel in the belt unwinding direction causes said angular movement of the control member and said translational movement of said spool and discs along said predetermined path from said spool disengaged position to said spool engaged position with the teeth of said discs in synchronous locking engagement with the locking formations on said frame members.

19. A retractor according to either of claim 3 or 15 wherein said inertia responsive actuating means is responsive to sudden acceleration of the ratchet wheel as caused by withdrawal of the belt.

20. A retractor for a vehicle according to either of claims 3 or 15 wherein said inertia responsive actuating means is responsive to movement of the vehicle.

21. A retractor for a vehicle according to claim 20 wherein said inertia responsive actuating means is further responsive to sudden acceleration of the ratchet wheel as caused by withdrawal of the belt.

* * * * *